United States Patent [19]
Muir et al.

[11] Patent Number: 5,282,555
[45] Date of Patent: Feb. 1, 1994

[54] STABILIZATION ASSEMBLY FOR BICYCLE RACKS

[76] Inventors: Scott W. Muir, 2419 E. 1300 South, Salt Lake City, Utah 84108; Dale H. Muir, 1633 Canyon Oak Cir., Bountiful, Utah 84010

[21] Appl. No.: 922,803

[22] Filed: Jul. 31, 1992

[51] Int. Cl.⁵ ............................................... F16D 1/00
[52] U.S. Cl. .............................. 224/42.03 B; 403/391
[58] Field of Search .................. 224/42.03 B, 42.03 R, 224/321, 323, 901; 403/24, 391, 395

[56] References Cited

U.S. PATENT DOCUMENTS

| | | | |
|---|---|---|---|
| 3,557,564 | 1/1971 | Hauber | 403/391 X |
| 4,470,528 | 9/1984 | Dyess | 224/901 X |
| 4,997,116 | 3/1991 | Grim | 224/42.03 B |
| 5,067,641 | 11/1991 | Johnson et al. | 224/42.03 B |
| 5,118,020 | 6/1992 | Piretti | 224/42.03 B X |
| 5,165,815 | 11/1992 | Allen | 224/42.03 B X |
| 5,170,917 | 12/1992 | Tourigny | 224/901 X |

FOREIGN PATENT DOCUMENTS 8001895 9/1980 World Int. Prop. O. .... 224/42.03 B

Primary Examiner—Renee S. Luebke
Attorney, Agent, or Firm—Jon C. Christiansen; Lee A. Hollaar

[57] ABSTRACT

A stabilization assembly for securing and stabilizing two or more bicycles on a bicycle rack. In a presently preferred embodiment, the assembly comprises a stabilization bar which can be selectively varied in length by sliding one tube within another. Each end of the stabilization bar is provided with a cradle and a securing strap. The stabilization bar is attached to the frame of each bicycle by resting a portion of the frame within one of the cradles and wrapping the associated securing strap around the frame. The strap is then secured to the frame using hook and loop fastener surfaces or other suitable means.

3 Claims, 2 Drawing Sheets

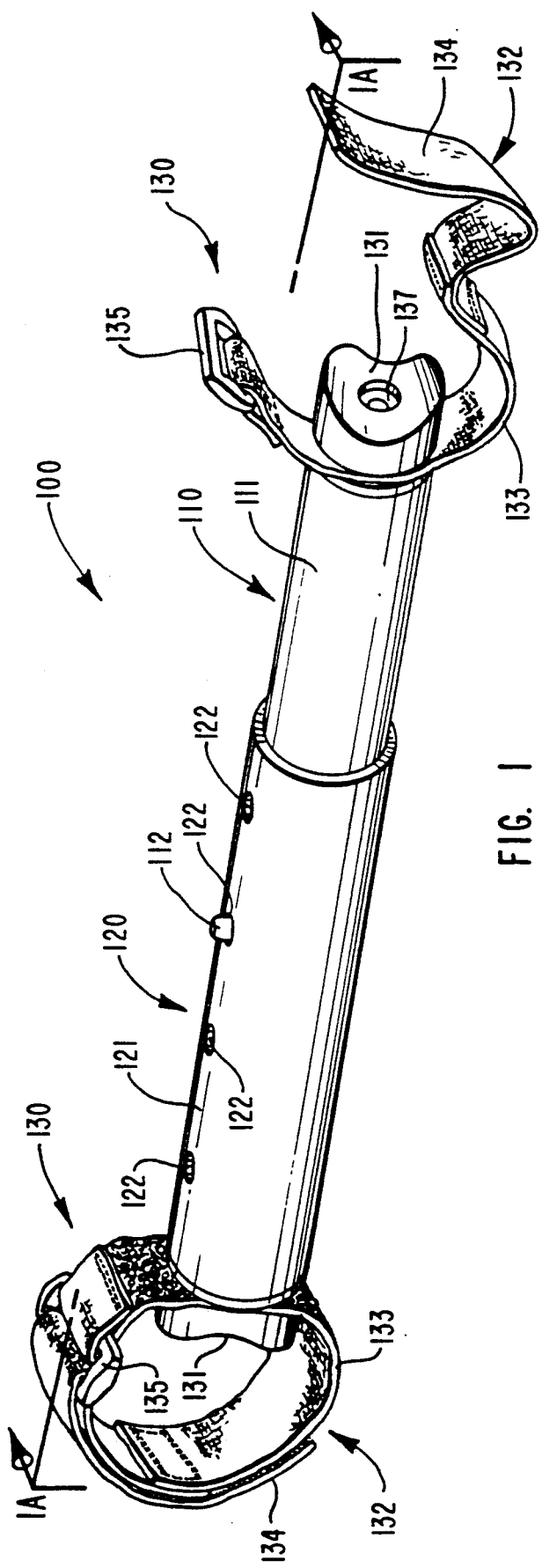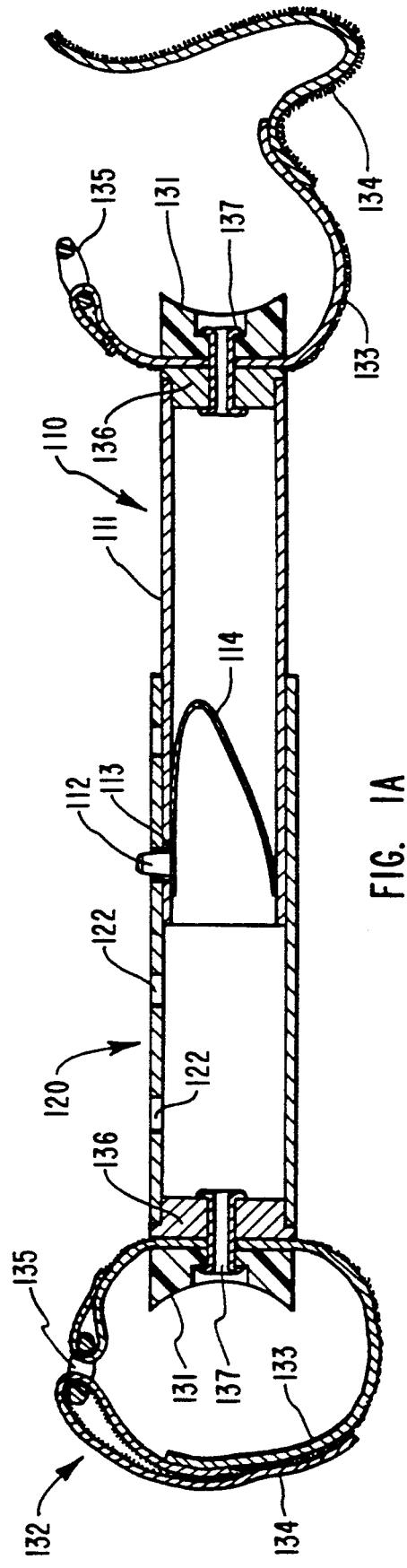
FIG. 1
FIG. 1A

STABILIZATION ASSEMBLY FOR BICYCLE RACKS

BACKGROUND

1. The Field of the Invention

This invention relates to devices used to stabilize two or more objects relative to each other, and more particularly, to a stabilization assembly for use in securing and separating two or more bicycles being held by a rack.

2. The Background Art

As the popularity of bicycling has increased, it is common for people to transport their bicycles on their automobile or truck to the place where the bicycles will be ridden. This is particularly true for specialized bicycles, such as racing bicycles or mountain bicycles. One common means for transporting bicycles on an automobile or truck is to hang them from a rack that is mounted to the bumper, trailer hitch, or other part of the vehicle transporting the bicycles.

On one of the most common types of bicycle racks, the bicycles are hung from hooks projecting from the rack. When a single bicycle is being transported, it is hung from the hooks of the rack and secured by holding it against the upright supports of the rack with elastic straps ("bungee cords") or similar means. This works reasonably well because the upright supports of the rack run adjacent to the frame of the bicycle being secured, but do not interfere with projecting portions of the bicycle, such as the handlebars or pedals.

However, when two or more bicycles are to be carried on the same frame, as would often be the case when a group is traveling together in the same vehicle to the place where the bicycles will be ridden, the situation becomes more complex. Not only must the bicycle hanging closest to the upright supports be secured to those supports, but the other bicycles must be secured to each other to prevent shifting, swaying, or other movement that might cause damage to the bicycles. This is often done using additional bungee cords.

Unfortunately, the use of bungee cords to secure multiple bicycles pulls the bicycles together, often causing damage as parts of two different bicycles touch or rub together. Moreover, unlike the rack which was designed to handle the projecting portions of a bicycle, when two bicycles are held together with bungee cords or similar means, their projecting portions often interfere with either other, increasing the possibility of damage to the bicycles.

BRIEF SUMMARY AND OBJECTS OF THE INVENTION

In view of the foregoing, it is a primary object of the present invention to provide an assembly for stabilizing bicycles being held by a rack.

It is a further object of the present invention to provide a stabilization assembly for bicycle racks which reduces the likelihood that the bicycles will be damaged during transport.

Consistent with the foregoing objects, and in accordance with the invention as embodied and broadly described herein, a stabilization assembly is disclosed in one embodiment of the present invention as including an adjustable-length rigid stabilization bar with means for attaching one end of the bar to the frame, or other part, of a first bicycle and the other end to the frame, or other part, of a second bicycle. This prevents those two bicycles from hitting, rubbing, or otherwise causing damage to each other. If desired, more than one stabilization bar can be used between the two bicycles in order to further hold them apart and stabilized with respect to each other.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 1 is a perspective view of one presently preferred embodiment of the stabilization assembly of the present invention showing the assembly and its component parts;

FIG. 1A is a sectional illustration of the embodiment of FIG. 1 taken along lines 1A—1A of FIG. 1.

DETAILED DESCRIPTION OF THE PREFERRED EMBODIMENT

Figure 2:
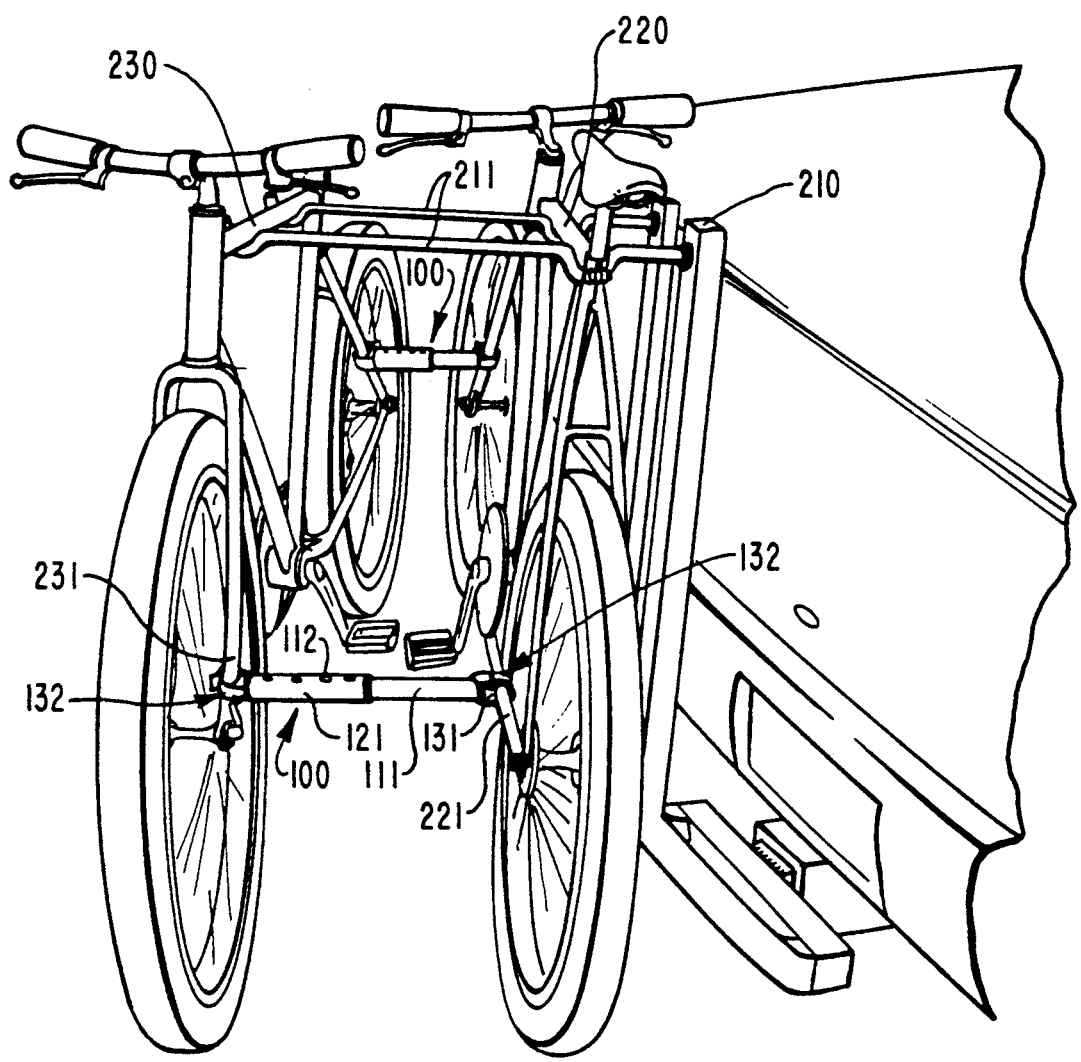
FIG. 2 is a perspective illustration of the stabilization assembly of the present invention depicting its use to stabilize two bicycles hanging from a rack.

It will be readily understood that the components of the present invention, as generally described and illustrated in the Figures herein, could be arranged and designed in a wide variety of different configurations. Thus, the following more detailed description of the embodiment of the stabilization assembly of the present invention, as represented in the Figures, is not intended to limit the scope of the invention, as claimed, but it is merely representative of the presently preferred embodiment of the invention.

The presently preferred embodiment of the invention will be best understood by reference to the drawings, wherein like parts are designated by like numerals throughout.

Referring to FIG. 1, one can see that the presently preferred embodiment of stabilization bar 100 comprises two assemblies 110 and 120. Each of assemblies 110 and 120 have a securing means 130. These assemblies 110 and 120, when working together, form a rigid bar with a securing means 130 at each end. Securing means 130 is used to temporarily attach stabilization bar 100 to the bicycle or other object it is being used to separate and stabilize.

Securing means 130 is comprised of a concave plastic cradle piece 131, a strap 132 having mating hook and loop fastener surfaces 133 and 134 (such fasteners being presently sold under the trademark "Velcro®"), a plastic ring 135 secured to the end of strap 132 opposite the mating hook and loop fastener surfaces 133 and 134, an aluminum end cap 136 which is pressed into one of the ends of tubes 111 and 121 (described further below), and a rivet 137. Rivet 137 fastens cradle piece 131 to end cap 136 and secures strap 132 between cradle piece 131 and end cap 136. Rivet 137 is preferably sized so that cradle piece 131 and strap 132 can freely rotate relative to cap 136, but without excessive free play.

A more preferred strap is a single strap made of nylon or other strong flexible material to which Velcro portions are sewn or attached at positions allowing for hook and loop fastening.

A number of other means can be used to attach the stabilization bar to the frame of a bicycle or other object. For example, a hook or clamp assembly fitting around a fixed-sized frame could be used, although it would not be as versatile as the presently preferred embodiment described above. In addition, means other than hook and loop fastener surfaces (such as, for example, a buckle), could be used for holding the strap 132 against the frame of the bicycle.

In addition to securing means 130, assembly 110 comprises a hollow one-inch (2.54 cm) diameter anodized aluminum tube 111, a detent pin 112 that extends outward from inside tube 111 through hole 113, and a spring assembly 114 inside tube 111 that forces detent pin 112 outward from tube 111. This is shown in more detail in FIG. 1A. Cap 136 fits inside tube 111 and attaches securing means 130 to tube 111, as described above.

Assembly 120 comprises a hollow 1⅛-inch (2.84 cm) diameter anodized aluminum tube 121 having a series of holes 122 of a size such that detent pin 112 can pass through one hole 122 but permitting minimal movement of detent pin 112 within hole 122. This locks the position of assembly 110 relative to assembly 120. As described previously, assembly 120 also includes a second securing means 130 attached to tube 121 by cap 136.

When fully extended, stabilization bar 100 may, for example, be approximately 9 inches (22.86 cm) long. The length of bar 100 when fully retracted, on the other hand, may be approximately 6 inches (15.24 cm). Of course, the stabilization bar can be made adjustable to any suitable length, depending upon the specific application.

In addition to the techniques of the presently preferred embodiment, as described above, there are numerous other ways of adjusting the length of stabilization bar 100. The two sections 110 and 120 of stabilization bar 100 could, for example, be threaded so that the length of stabilization bar 100 can be adjusted by screwing one section within the other section. Alternatively, a clamping mechanism could secure one section's position relative to the other. Other means of adjusting the length of stabilization bar 100 will be readily apparent to one of ordinary skill in the art, and such means are intended to be embraced within the scope of the present invention.

Stabilization bar 100 could also be of a fixed length, predetermined to provide the proper separation between two bicycles on a given rack. While not as versatile as the adjustable bar of the preferred embodiment, a bar of the proper fixed length would, of course, provide similar protection against damage as a variable-length stabilization bar.

FIG. 2 shows bicycles 220 and 230 hanging from hooks 211 of a typical bicycle rack 210, with bicycle 220 being placed on rack 210 first and secured to rack 210 with bungee cords or some other device. Stabilization bar 100 is first secured to a portion of the frame 221 of bicycle 220 by placing one cradle piece 131 against frame 221. The associated strap 132 is then brought around frame 221, passed through ring 135, and doubled back on itself. Hook and loop fastener surfaces 133 and 134 are then pressed together to secure strap 132 against frame 221 of bicycle 220.

After stabilization bar 100 has been secured to frame 221 of bicycle 220, its length is adjusted by pressing in detent pin 112, sliding tube 111 within tube 121 so that the length of stabilization bar 100 provides the desired separation distance between bicycles 220 and 230. Stabilization bar 100 is then secured to frame 231 of bicycle 230 in the manner described above in relation to bicycle 220.

From the above discussion, it will be appreciated that the present invention provides an assembly for stabilizing bicycles being held by a bicycle rack. The present invention thus significantly reduces the likelihood that the bicycles will be damaged during transport, since the bicycles are effectively prevented from hitting, rubbing, or otherwise causing damage to each other.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A stabilization assembly for use in securing a plurality of bicycles on a rack, the assembly comprising:
   A first bar assembly comprising:
   A hollow tube, and
   A securing assembly for securing a first said bicycle to said first bar assembly, comprising:
   A cradle piece fitting against the frame of said first bicycle,
   A strap extending around the frame of said first bicycle, and
   Means for securing said strap around the frame of said first bicycle; and
   A second bar assembly comprising:
   A second tube sized to slide within said hollow tube of said first bar assembly such that the length of said stabilization assembly can be adjusted, and
   A securing assembly for securing a second said bicycle to said second bar assembly, comprising:
   A cradle piece fitting against the frame of said second bicycle,
   A strap extending around the frame of said second bicycle, and
   Means for securing said strap around the frame of said second bicycle; and
   Means for selectively securing said second tube of said second bar assembly within said hollow tube of said first bar assembly.

2. A stabilization assembly as defined in claim 1, wherein each said means for securing the strap of each securing assembly comprises mating hook and loop fastener surfaces.

3. A stabilization assembly as defined in claim 1, wherein said means for selectively securing said second tube of said second bar assembly within said hollow tube of said first bar assembly comprises a detent pin projecting through aligning holes in said hollow tube and said second tube, said detent pin being held in place by a spring assembly.

* * * * *